United States Patent [19]

Huber et al.

[11] Patent Number: 4,825,078
[45] Date of Patent: Apr. 25, 1989

[54] RADIATION SENSOR

[75] Inventors: James V. Huber, Oak Park; Jacob Tikhtman, Lincolnwood, both of Ill.

[73] Assignee: Atlas Electric Devices Co., Chicago, Ill.

[21] Appl. No.: 112,666

[22] Filed: Oct. 22, 1987

[51] Int. Cl.⁴ .............................................. G01J 5/04
[52] U.S. Cl. ................................. 250/372; 250/370.15
[58] Field of Search ................ 250/352, 365, 370 L, 250/372

[56] References Cited

U.S. PATENT DOCUMENTS

| | | | |
|---|---|---|---|
| 3,103,587 | 9/1963 | Ure, Jr. et al. | 250/352 |
| 3,227,885 | 1/1966 | Hirai et al. | 250/238 |
| 3,274,030 | 9/1966 | Salomon | 136/259 |
| 3,437,807 | 4/1969 | Moore | 250/372 |
| 3,602,721 | 8/1971 | Nakamura et al. | 250/238 |
| 4,090,071 | 5/1978 | McCarter | 250/238 |
| 4,096,387 | 6/1978 | Buckley | 250/372 |
| 4,194,118 | 3/1980 | Kotaka et al. | 250/343 |
| 4,230,945 | 10/1980 | Meir et al. | 250/370 |
| 4,348,664 | 9/1982 | Boschetti et al. | 340/600 |
| 4,575,629 | 3/1986 | Schnell et al. | 250/238 |

OTHER PUBLICATIONS

LMT Products Brochure (Apr. 1987).

*Primary Examiner*—Janice A. Howell
*Assistant Examiner*—Constantine Hannaher
*Attorney, Agent, or Firm*—Gerstman & Ellis, Ltd.

[57] ABSTRACT

A radiation sensor comprises a housing, a radiation filter, and a photocell positioned to sense radiation passing through the filter. Means are provided for receiving signals from the photocell indicative of radiation sensed by the photocell. In accordance with this invention, means are provided for hermetically sealing the filter and photocell from the exterior, and also for providing cooling (and optionally heating) of the filter and photocell to hold their respective temperatures below predetermined maximum levels, for improvement of sensing accuracy and operating life.

13 Claims, 1 Drawing Sheet

RADIATION SENSOR

BACKGROUND OF THE INVENTION

Radiation sensors are used in a wide variety of fields. Particularly in the field of testing of materials and coatings for their out-of-doors stability and other stressful environments, it is desired to make use of accelerated aging tests under artificial conditions. However, these artificial conditions must be constantly correlated with natural conditions in order to assure the artificial testing conditions provide useful data.

In outdoor aging tests, as well as stations for accelerated aging, difficulties have been achieved in providing proper measurement of the total exposure of sunlight or other radiation received by the object being tested.

The most significant portion of solar energy is its ultraviolet component. Despite the importance of the monitoring of solar ultraviolet radiation applied to exposed specimens, such monitoring has been restricted by the available technology that limits the accuracy and reliability of radiometers intended for such use. As one example, low latitude testing stations, of course, can provide a great deal of sunlight exposure to test objects. The temperatures can become so hot, and the humidity can become so high, to shorten the useful life of current radiometers, and also to cause them to exhibit inaccuracies of readout.

In the prior art, an ultraviolet radiometer has been commercially used for outdoor testing purposes. As an example of current technology, a TUVR radiometer employing a wide band UV filter is available and advertised as covering a wide range of 295–380 nm. ultraviolet wavelength. These wave length limits are actually the cut-on and the cut-off wave lengths at which 5% transmittence through the apparatus filter is achieved. The half peak band width is about 60 nm. covering the approximate wave length interval 300–370 nm. A selenium barrier-layer photocell, the spectral sensitivity of which to shorter wave length UV is much less than its peak sensitivity to visible light, is used. This means that it is much more sensitive to fluctuations in the longer wave length UVA portions of the solar spectrum than to variations to the shorter wave length UVB region. The radiometer is not thermo-regulated, and unless the radiation filter used is designed for accuracy at elevated temperatures, there will be a slight shift in peak response to longer wave lengths as temperature increases.

The above described radiometer, and other radiometers, are also sensitive to moisture, which can condense at night after having seeped into the interior of the radiometer during the daytime in high-humidity areas. The condensed droplets can provide significant inaccuracy to subsequent radiation sensing, and can also accelerate deterioration of the device. Similarly, high temperatures can damage both the interference light filters and photosensors used.

In accordance with this invention, a radiation detector is provided which is capable of withstanding the rigors of all-day exposure to the sun and weather in tropical areas, containing to operate and provide accurate radiation exposure data for periods of time which tend to greatly exceed the useful lives of previous photodetectors used for that purpose. Additionally, the radiation detector of this invention may be used in other harsh environments as well, and for any desired purpose.

DESCRIPTION OF THE INVENTION

In accordance with this invention, a radiation sensor is provided which comprises a housing, a radiation filter, a photocell positioned to sense radiation passing through the filter, and means for receiving signals from the photocell indicative of radiation sensed by the photocell.

In accordance with this invention, means are provided for hermetically sealing the filer and photocell from the exterior within the housing. Means are also provided for cooling the filter and photocell to hold their respective temperatures below predetermined maximum levels, for example below 40 degrees C. for improvement of either or both sensing accuracy and operating life.

Specifically, the cooling means described above may be thermoelectric in nature, comprising a conductive metal block positioned in heat exchange relation with the filter and photocell. Thermoelectric crystal means, having a heat generating side and a heat absorbing side, are provided, with the heat absorbing side being in heat exchange relation with the conductive metal block. Some kind of radiation fins may then be placed in communication with the heat generating side for efficiency of heat dissipation. The filter and photocell are preferably positioned in a recess defined in the conductive metal block.

The specific embodiment of the invention disclosed herein utilizes a radiation filter which transmits substantially only ultraviolet radiation, for gathering solar exposure data in that predetermined range. The means for receiving signals from the photocell preferably includes means for integrating the signals received from the photocell, to provide a readout corresponding to the overall, integrated, total ultraviolet radiation exposure received by the photocell in a given period of time. However, the device may be used to measure other areas of the spectrum as well, for example visible light, infra red, or the like.

The filter and photocell may be hermetically sealed in a chamber, the chamber having sealed port means to permit filling of the chamber with pressurized, dry gas. While any inert gas may be used, dry nitrogen gas (preferably of no more than 1% relative humidity) is the typical choice with the inert gas being preferably present in the chamber at a pressure which is over atmospheric pressure, to reduce the diffusion of outside air and humidity into the system. Particularly, the dry nitrogen may be present at a pressure of from 3–30 psi over atmospheric pressure, specifically about 20 psi.

A translucent, light-diffusing window may be positioned in front of the radiation filter as part of the hermetic sealing means. The window may be made, for example, of polytetrafluorotethylene. Nitrogen gas is particularly preferred as the inert gas in this circumstance, since its diffusion rate through such a window is slow, so that the radiation sensor may be pressurized with nitrogen gas, and hold its pressure without additional pressurization for a substantial period of time, typically approximating a year.

It may also be desired for a heating capability to be provided to the radiation sensor as well as the cooling capability, for temperature maintenance of the filter and photocell within a predetermined range. This is conveniently done by means of the preferred thermoelectric heating and cooling system.

DESCRIPTION OF SPECIFIC EMBODIMENT

Figure 1:
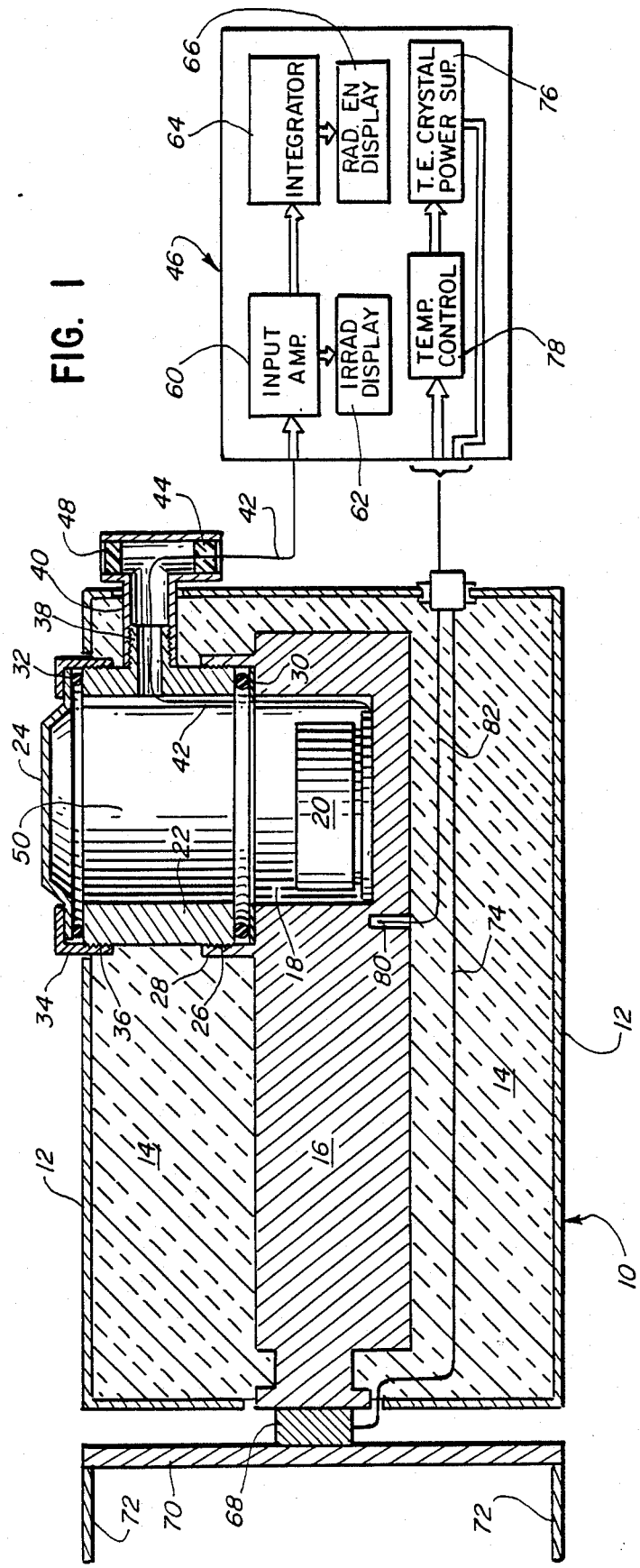
FIG. 1 is a longitudinal sectional view of a radiation sensor in accordance with this invention, with a portion thereof shown schematically.

Referring to the drawings, an insulated radiation sensor 10 is disclosed, defining outer casing 12 which is packed with thermal insulation 14 such as polyurethane foam, for purposes of insulating metal cold block 16, which may be made of aluminum and which serves as a heat sink.

Recess 18 is provided in cold block 16, which carries filter and photodetector assembly 20. Recess 18 communicates with the interior of sleeve 22 which, in turn, is open to light diffuser plate 24, which serves to transmit the scattered light and may be made of polytetrafluoroethylene, so that light passing through the diffuser plate can also pass through the bore of sleeve 22 to the filter and photodetector assembly 20 for detecting and measuring of exterior light. Sleeve 22 may be screwed into its position with O-ring 30 positioned between block 16 and sleeve 22 for sealing purposes.

Similarly, diffuser plate 24 may be firmly and sealingly retained in engagement with sleeve 22, with O-ring 32 postioned between them, by the action of annular sealing cap 34 which defines screw threads 36 for engagement with corresponding screw threads on the end of sleeve 22 opposed from the end that faces block 16.

Chamber-defining sleeve 22 also carries a side port 38. Port 38, in turn, is in screw-threaded attachment relation with tubular T-connector 40. One branch of the T of connector 40 receives an electrical line 42 through a conventional hermetic seal 44 of T-connector 40. Line 42 communicates between electronics assembly 46, which may be positioned remotely from radiation sensor 10 in a protected area, and the filter and photocell assembly 20 to power the photodetector positioned therein. Line 42 contains three wires (two signals and one ground).

The other branch 48 of T-connector 40 may be equipped with a conventional sealed connector permitting conection with a source of pressurized gas, to periodically provide dry, pressurized gas to the sealed chamber 50 defined by diffuser 24, sleeve 22, and recess 18, containing filter and photocell assembly 20. As stated above, it is preferred to keep chamber 50 filled with a dry, inert gas such as nitrogen gas in an initial pressure of about 20 psi over atmospheric pressure. This restricts the access of moisture into chamber 50 and assembly 20, but nitrogen gas diffuses only a very slow rate through polytetrafluorethylene diffuser plate 24, and apart from that chamber 50 may be hermetically sealed.

Figure 2:
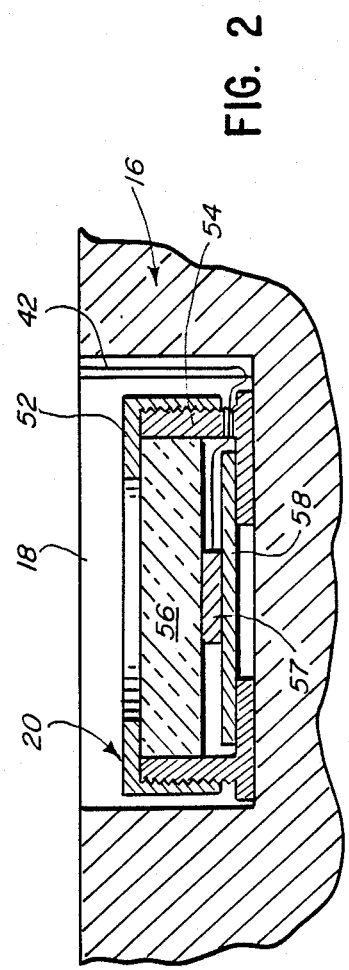
FIG. 2 is a fragmentary, enlarged, longitudinal sectional view of a portion of the device of FIG. 1, featuring a sectional view of a portion of FIG. 1 which is shown there in elevation.

Turning also to FIG. 2, the interior design of filter and photocell assembly 20 is disclosed. Screw threaded retaining ring 52 fits about upstanding sleeve 54 within recess 18, to retain interference filter 56 in a retained position above photocell 57. Both filter 56 and photocell 57 may be of conventional design, being preferably adapted for sensing of ultraviolet radiation passing through diffuser plate 24. Photocell 57 rests upon support plate 58, and sends a signal through line 42 to the generally remote electronics package 46 indicative of the intensity of ultraviolet light received through filter 56 and diffuser plate 24. In electronics package 46, line 42 passes to input amplifier 60. The amplifier signal is displayed as a radiance at digital readout 62, which may also be recorded by conventional means as desired. The amplifier signal is also integrated by integrator 64, which may be of conventional design, and the total, received radiant energy for a specified time period is displayed by digital readout 66, and also recorded by any conventional means desired.

As radiation sensor 10 is exposed to high temperatures, for example by sitting in the hot sun on a solar exposure rack along with samples to be tested, its exterior temperature can rise to a level which can be damaging both to interference filter 56 and UV photosensor 57. This can result both in the shortening of the useful life of the apparatus, and also it can result in readout error as the high temperature causes changes in the operation of the devices.

To address this problem, thermoelectric crystal 68, of conventional design, is provided, being positioned against heat sink block 16 on one side in heat exchange relation therewith, and also being in heat exchange relation with a conductive metal radiator assembly 70 having fins 72 of conventional design. Electric line 74 (containing two wires) communicates between thermoelectric crystal 68 and thermoelectric crystal power supply circuitry 76, controlled by electronic temperature control 78. The electronics of members 76, 78 may also be of conventional design. Additionally, a thermistor 80 communicates by means of electrical line 82 (containing two wires) to temperature control 78, so that the temperature of block 16 adjacent filter and photocell assembly 20 may be electronically monitored, for automatic temperature control of light monitor 10.

Accordingly, as the apparatus of this invention operates, thermoelectric crystal 68 is driven to remove heat from block 16 and to radiate it from radiator 70. Block 16, in turn, cools the walls of recess 18, with the result that interference filter 56 and photodetector 57 operate in a cool environment despite the presence of intense heat caused by hours of direct sunlight, or for any other reason. Thus the apparatus of this invention can be expected to exhibit a useful life under rigorous conditions which is much longer than is found in corresponding units of the prior art. Additionally, the accuracy of radiaton sensing will be improved as members 56, 57 are protected from unfavorable heating conditions.

Additionally, interference filter 56 and photocell 57 may be heated as necessary by a simple reversal of polarity of the electric current through electric line 74, controlled by electronics 46, to cause thermoelectric crystal 68 to heat block 16 rather than to cool it, for warming of filter 56 and photosensor 57 to a desired operating temperture when that is needed. In that circumstance, heat is absorbed from radiator 70.

Typically, diffuser 24 cuts down at least 80 percent of the incident radiation transmission to protect filter 56 and photodetector 57 from excess radiation.

Accordingly, by this invention, an apparatus is provided in which the interference filter 56 and photodetector 57 are maintained in a temperature-controlled and hermetically sealed environment. Thus the device may be operated in out-of-doors, tropical environments, and other extreme conditions, with a greatly increased useful life, when compared with prior art devices. The presence of water vapor can shorten the useful life of an apparatus similar to this where the materials used in the interference filter are hygroscopic. Additionally, if water vapor present condenses into water inside the apparatus, the condensate can scatter the light if it is present on the optics. Likewise, the photocell can have greatly reduced electrical output in the presence of water. The advantages described above, including the significant extension of useful life provided by the temperature control system of this invention, result in a greatly improved operation and useful life.

The above has been offered for illustrative purposes only, and is not intended to limit the scope of the invention, which is as defined in the claims below.

That which is claimed is:

1. In an ultraviolet radiation sensor which comprises a housing, a radiation filter, a photocell positioned to sense radiation passing through said filter, and means for receiving signals from said photocell indicative of ultraviolet radiation sensed by the photocell, the improvement comprising, in combination: means for hermetically sealing said filter and photocell from the exterior, and means for cooling said filter and photocell to hold their respective temperatures below predetermined maximum levels, for improvement of sensing accuracy and operating life, said cooling means comprising a conductive metal block defining a recess, said filter and photocell being positioned in heat exchange relation with said block within said recess, and thermoelectric crystal means having a heat generating side and a heat absorbing side, said heat absorbing side being in heat exchange relation with a surface of said conductive metal block, said heat generating side being exposed to the exterior for heat exchange with the atmosphere, said radiation filter permitting transmission of substantially only ultraviolet radiation.

2. The radiation sensor of Claim 1 in which circuit means are present permitting said thermoelectric crystal means to be capable of heating said block for also providing minimum temperature maintenance thereof.

3. The radiation sensor of Claim 2 in which said means for receiving signals from the photocell includes means for integrating the signals received from the photocell to provide a readout corresponding to the overall, integrated total radiation exposure in a predetermined spectral range received by said photocell in a given period of time.

4. The radiation sensor of Claim 3 in which said filter and photocell are sealed in a chamber, said chamber having sealed port means to permit filling of said chamber with pressurized, dry gas.

5. The radiation sensor of Claim 4 in which a translucent light diffusing window made of polytetrafluoroethylene is positioned in front of said radiation filter as part of said hermetic sealing means.

6. the radiation sensor of Claim 5 in which said chamber is filled with dry nitrogen at a pressure of 3 to 30 psi over atmospheric pressure.

7. The radiation sensor of Claim 1 in which said heat generating side of the thermoelectric crystal means is positioned in heat exchange relation with a finned, heat conductive metal radiator for improved heat exchange between said thermoelectric crystal means and the atmosphere.

8. The radiation sensor of Claim 7 in which circuit means are present permitting said thermoelectric crystal means to alternatively be capable of heating said block for providing minimum temperature maintenance thereof.

9. The radiation sensor of Claim 8 in which said means for receiving signals from the photocell includes means for integrating the signals received from the photocell to provide a readout corresponding to the overall, integrated total radiation exposure in a predetermined spectral range received by said photocell in a given period of time.

10. The radiation sensor of Claim 9 in which said filter and photocell are sealed in a chamber, said chamber having sealed port means to permit said filling of said chamber with pressurized, dry gas.

11. The radiation sensor of Claim 10 in which a translucent light diffusing window made of polytetrafluoroethylene is positioned in front of said radiation filter as part of said hermetic sealing means.

12. The radiation sensor of Claim 11 in which said chamber is filled with dry nitrogen at a pressure of 3 to 30 psi over atmospheric pressure.

13. The radiation sensor of Claim 7 in which said thermoelectric crystal means is positioned entirely exterior of said conductive metal block.

* * * * *